United States Patent [19]

Fadel

[11] Patent Number: 4,999,468

[45] Date of Patent: Mar. 12, 1991

[54] OVEN STRUCTURE, MAINLY FOR COOKING OF NATURAL AND/OR DEEP-FROZEN AND/OR PRE-COOKED FOOD

[76] Inventor: Paolo Fadel, Via Manzoni 30, 31042 Fagare'-S. Biagio (TV), Italy

[21] Appl. No.: 363,424

[22] Filed: Jun. 6, 1989

Related U.S. Application Data

[63] Continuation of Ser. No. 175,248, Mar. 30, 1988, abandoned.

[51] Int. Cl.$^5$ ............................................. H05B 6/80
[52] U.S. Cl. ...................... 219/10.55 A; 219/10.55 B; 219/10.55 E; 219/389; 99/451; 99/325; 392/407
[58] Field of Search ................. 219/10.55 A, 10.55 R, 219/10.55 M, 10.55 B, 10.55 E, 388, 389, 350, 352; 99/451, 325, DIG. 14

[56] References Cited

U.S. PATENT DOCUMENTS

| | | | |
|---|---|---|---|
| 3,541,289 | 11/1970 | Smith | 219/10.55 M |
| 3,699,899 | 10/1972 | Schiffmann et al. | 219/10.55 A |
| 3,700,051 | 10/1987 | Goessler et al. | 219/464 |
| 3,881,403 | 5/1975 | Ingram et al. | 219/10.55 A |
| 4,039,796 | 8/1977 | Leibin et al. | 219/10.55 A |
| 4,477,706 | 10/1984 | Mittelsteadt | 219/10.55 B |
| 4,687,895 | 8/1987 | Chitre et al. | 219/10.55 A |

Primary Examiner—Philip H. Leung
Attorney, Agent, or Firm—Wenderoth, Lind & Ponack

[57] ABSTRACT

The present invention is drawn to a combination microwave/infrared oven heating a box-like structure in which a plurality of chambers are defined. A microwave heating source is associated with at least one of the chambers for generating microwaves therein, an infrared short-wave radiation source is associated with at least another one of the chambers for generating short-wave infrared radiation therein, and a medium-wave infrared radiation source is associated with at least yet another one of the chambers for generating medium-wave infrared radiation therein. A rotary conveyor is rotatably supported in the oven within the box-like structure and conveys foodstuffs in the oven successively through the chambers. An electronic circuit including a central logic system controls the operation of the rotary conveyor to set the time periods during the foodstuffs conveyed in the oven remain in respective ones of the chambers. The central logic system may also control the operation of the microwave heating source, the short-wave infrared radiation source and the medium-wave infrared radiation source.

8 Claims, 1 Drawing Sheet

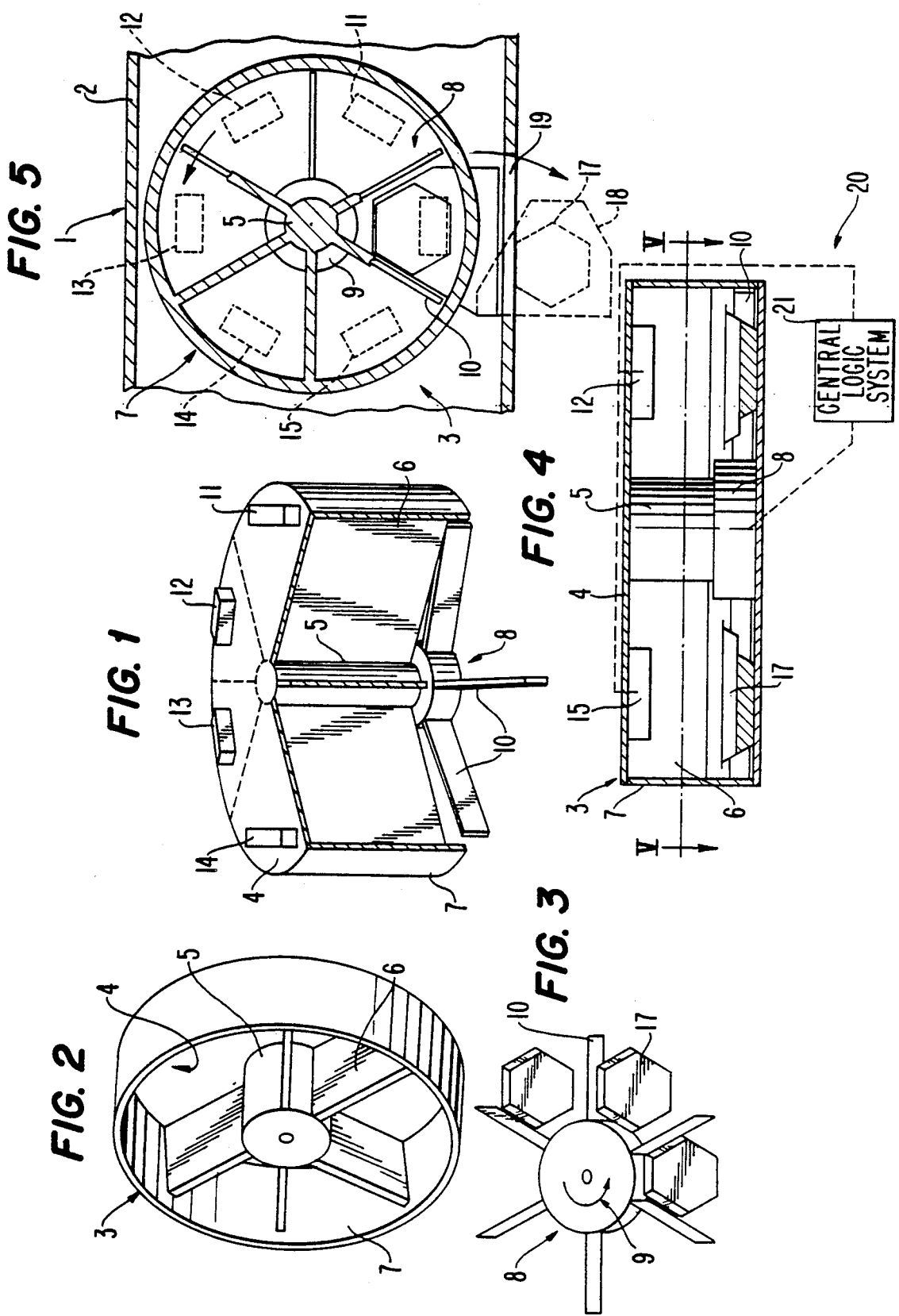

OVEN STRUCTURE, MAINLY FOR COOKING OF NATURAL AND/OR DEEP-FROZEN AND/OR PRE-COOKED FOOD

This application is a continuation of now abandoned application, Ser. No. 07/175,248 filed on Mar. 30, 1988.

BACKGROUND OF THE INVENTION

The invention relates to oven structure mainly useful for cooking natural, deep-frozen and/or pre-cooked food.

Nowadays many types of ovens are known using gas combustion, resistance heating or microwaves to cook food.

All of these types of ovens, whether they provide a natural internal ventilation or a forced one, present a problem of not allowing optimum cooking of the food in very short times as the cooking time required can be different.

In fact, the microwave oven, although it can quickly defrost deep-frozen food, can only cook food uniformly without varying the degree of the cooking and humidity from the inside to the outside of the food, for example, to make the food surface baked and crusty.

SUMMARY OF THE INVENTION

Therefore, the main object of the invention is to eliminate the above-mentioned problem in known ovens by providing an oven in which food that is differentiated is cooked appropriately in very short times.

Another important object is to provide a structurally simple oven having small dimensions that can cook a large number of single portions of food, even of different quality, in a short time. Another object is to provide a structurally simple oven that is compact and usable with vending machines for cooking deep-frozen and/or pre-cooked and/or natural-state food.

The above-mentioned objects, as well as others that will appear more clearly hereinafter, are achieved by an oven of the invention, mainly for cooking natural and/or deep-frozen and/or pre-cooked food, characterized by a container defining a fixed box-like structure subdivided into radial sectors and inside of which is operatively disposed a rotary conveyor having radially extending elements, seats for a plate of natural and/or pre-cooked and/or deep-frozen food, at least one source for microwave heating, at least one source for infrared radiation microwave cooking and at least one medium-wave radiation source for baking and crusting the surface of food. The conveyor and sources are controlled by an electronic circuit including a centralized logic system. Further, the oven includes means for allowing the introduction and removal of said plates.

BRIEF DESCRIPTION OF THE DRAWINGS

Further features and advantages of the invention will appear more clearly from the detailed description of a particular embodiment thereof with reference to the drawings, in which:

FIG. 1 is a partially cut-away perspective view of a fixed box-like structure and a rotary conveyor of the oven of the present invention;

FIG. 2 is a perspective view, from the bottom, of the box-like structure shown in FIG. 1;

FIG. 3 is a perspective view of the rotary conveyor shown in FIG. 1;

FIG. 4 is a sectional view of the oven of the present invention; and

FIG. 5 is a partially cut-away longitudinal sectional view of the oven as taken along line V-V in FIG. 4.

DETAILED DESCRIPTION OF THE PREFERRED EMBODIMENT

With reference to the figures, the oven 1 includes a container 2 inside of which a box structure 3 is fixed, the box structure being mainly cylindrical with an upper closing wall 4 and open at the bottom.

Extending axially to the structure 3 is a cylindrical shaft 5 from which some radial sectors 6 branch off. Four adjacent sectors are equally spaced by angular intervals of about sixty degrees and the remaining ones by an angular interval of about one hundred and twenty degrees.

Each one of such radial sectors 6 is connected to the side 7 of the box structure 3 and extends, similarly to the shaft 5, a distance beyond the side 7.

In fact, below the shaft 5 and coaxial to the longitudinal axis thereof is a rotary conveyor 8 rotatably connected with the structure 3 and driven by a suitable motor.

The conveyor has a central body 9 that is circular and from which some radial elements 10 branch off, are equally spaced by an angular interval of about 60 degrees, and the free ends of which skim over the inside surface of the side 7 of the box structure 3.

Connected to the wall 4 inside the box structure 3 are two first sources 11 and 12 for microwave heating disposed over the space interposed between the two radial sectors 6 spaced by the angle of one hundred and twenty degrees. Anticlockwise in FIG. 5 and below the closing wall 4 are positioned, each in correspondence with the space interposed between two adjacent radial sectors spaced by sixty degrees, two second sources 13 and 14 for infrared radiation shortwave cooking and two third sources 15 and 16 capable of producing infrared medium-wave radiations for the surface baking and crusting of the food. The food is contained in plates 17 positioned between adjacent ones of the radial elements 10.

Such plates are moved inside the box structure 3 by means of the radial elements 10 of the rotary conveyor 8. All such sources 11, 12, 13, 14, 15 and 16 and the rotary conveyor 8 are controlled by an electronic circuit 20 including a centralized logic system 21 which sets, according to a predetermined and selected program, for example, the wavelengths of the sources and the operating times that shall be lower than the pace of the rotary conveyor 8.

In this way, the times during which each plate 17 remains below one of the sources are set according to the type of food to be cooked.

The containers 17 are put in the box structure 3 in the space associated with the source 11 and are carried outside the container 2 from the space associated with the source 16.

Concerning such a last stage, a rotary part 18 is provided to support the plate 17 and which part 18, by rotating ninety degrees, carries plate 17 through an opening 19 in the container 2.

The operation of the oven is as follows: after putting in the box structure 3 a plate 17, the centralized logic system sets, according to whether the oven contains natural-state, pre-cooked or deep-frozen food, the times during which the plate 17 will remain at the various stations by controlling the rotation of the rotary conveyor 8 and the operating times of the various sources. In this way, the oven can facilitate the optimum cooking of any kind of food, a considerable reduction in the cooking times and the possibility of cooking, for a longer or shorter time, the inside part of food compared with the outside part of the food.

Furthermore, the invention allows, considering the cooking speed and the contemporaneous number of plates that can be positioned inside the box structure 3, a considerable increase in the production rate of cooked food. Furthermore, the oven structure is particularly advantageous in cooking plates of natural, pre-cooked and deep-frozen food in very short times. Also, the structure of the oven is compact. Of course the materials and dimensions of the component parts of the oven such as the radial sectors, the radial elements and the sources, can be of any kind, according to specific requirements.

I claim:

1. Combination microwave/infrared oven structure with rotary conveyor comprising;
   a container having a bottom,
   a downwardly open cylindrical box-like structure downwardly fixed to said bottom of said container,
   an upper closure wall upwardly closing said box-like structure,
   a lateral surface defined internally on said box-like structure,
   a shaft protruding axially within said box-like structure from said upper closure wall towards said bottom,
   a plurality of angularly spaced radial sectors each connected to said shaft, said lateral surface, and said upper closure wall, said plurality of sectors consisting of;
   a first sector,
   a second sector angularly spaced from said first sector to define therebetween a first station, said first station constituting a first microwave cooking chamber,
   a third sector angularly spaced from said second sector to define therebetween a second station, said second station constituting a first short-wave infrared radiation cooking chamber,
   a fourth sector angularly spaced from said third sector to define therebetween a third station, said third station constituting a second short-wave infrared cooking chamber, and
   a fifth sector angularly spaced from said fourth sector and from said first sector, thereby defining a fourth station between said fourth sector and said fifth sector, and a fifth station between said fifth sector and said first sector, said fourth station constituting a first medium-wave infrared cooking chamber, said fifth station constituting a second medium-wave infrared cooking chamber,
   said over structure further comprising;
   rotary conveyor means located within said box-like structure coaxial to said shaft between said bottom of said container and said plurality of sectors, said rotary conveyor means having a plurality of radial elements, said radial elements being adapted for moving plates through said first station, said second station, said third station, said fourth station and said fifth station, inlet means for permitting plates containing uncooked food to be operatively engaged by said conveyor means, outlet means for permitting plates of cooked food to be removed from said conveyor means,
   at least one electronic circuit,
   at least one logic unit, and
   heating means constituted by;
   at least one first microwave heating source and at least one second microwave heating source located at said first station,
   at least one first short-wave infrared radiation heating source located at said second station,
   at least one second short-wave infrared radiation heating source located at said third station,
   at least one first medium-wave infrared radiation heating source located at said fourth station, and at least one second medium-wave infrared radiation heating source located at said fifth station,
   said electronic circuit and said logic unit being adapted for controlling said conveyor means and intervention times and wavelengths of said first microwave heating source, said second microwave heating source, said first short-wave infrared radiation heating source, said second short-wave infrared radiation heating source, said first medium-wave infrared radiation heating source and said second medium-wave infrared radiation heating source.

2. An oven comprising:
   a container having a bottom;
   a box-like structure fixed to said container, said box-like structure having a top wall, a side wall, an open bottom disposed on and closed by the bottom of said container, and a plurality of angularly spaced sectors extending radially within said box-like structure from a center portion thereof to said side wall so as to define a plurality of chambers within said container between adjacent ones of said sectors;
   microwave heating means associated with at least one of said chambers for generating microwaves in said at least one of said chambers;
   shortwave infrared radiation means associated with at least another one of said chambers for generating shortwave infrared radiation in said at least another one of said chambers;
   medium-wave infrared radiation means associated with at least yet another one of said chambers for generating medium-wave infrared radiation in said at least yet another one of said chambers;
   rotary conveyor means rotatably supported in the oven within said box-like structure for rotating within said box-like structure to convey foodstuffs in the oven through said chambers in succession; and
   electronic circuit control means including a central logic system operatively connected to said microwave heating means, said shortwave infrared radiation means, said medium-wave infrared radiation means and said rotary conveyor means for controlling the operation of said rotary conveyor means to convey foodstuffs through said chambers in predetermined time periods, and for controlling the operation of said microwave heating means, said shortwave infrared radiation means and said medium-wave infrared radiation means as said rotary conveyor means conveys foodstuffs in the oven through said chambers.

3. An oven as claimed in claim 2, wherein the side wall of said box-like structure extends beyond said sectors to the bottom of said box-like structure, and said rotary conveyor means includes a central portion and radial elements extending radially from said central portion, said radial elements located in an area defined between said sectors and the bottom of said container.

4. An oven as claimed in claim 2, wherein said plurality of sectors comprise five sectors, four of said sectors being equally spaced apart from one another by angular intervals of sixty degrees and two adjacent ones of said sectors being spaced apart from one another by an angular interval of one hundred and twenty degrees.

5. An oven as claimed in claim 4, wherein said rotary conveyor means has a central portion extending coaxially to the center portion of said box-like structure, and six radial elements extending radially from said central portion to the side wall of said box-like structure.

6. An oven as claimed in claim 4, wherein said microwave heating means comprises two microwave heating sources associated with the chamber defined within said box-like structure between said two adjacent sectors spaced apart from one another by an angular interval of one hundred and twenty degrees.

7. An oven as claimed in claim 4, wherein said shortwave infrared radiation heating means comprises two shortwave infrared radiation sources respectively associated with two of said chambers defined within said box-like structure between said sectors spaced apart from one another by angular intervals of sixty degrees, and said medium-wave infrared radiation means comprises two medium-wave infrared radiation sources respectively associated with the other two of said chambers defined within said box-like structure between said sectors spaced apart from one another by angular intervals of sixty degrees.

8. An oven as claimed in claim 2, and further comprising a rotary part pivotally mounted in the oven and disposed in one of said chambers, said rotary part pivotal between a first position within said one of said chambers to a second position outside of said container so as to remove foodstuff in the oven conveyed to said one of said chambers by said rotary conveyor means.

* * * * *